(12) United States Patent
Cheng

(10) Patent No.: US 8,738,997 B2
(45) Date of Patent: *May 27, 2014

(54) METHODS AND SYSTEMS USING THRESHOLD SWITCHES FOR PROTOCOL ACCELERATORS

(75) Inventor: Steven Cheng, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1164 days.

This patent is subject to a terminal disclaimer.

(21) Appl. No.: 12/357,896

(22) Filed: Jan. 22, 2009

(65) Prior Publication Data

US 2010/0185911 A1    Jul. 22, 2010

(51) Int. Cl.
*H03M 13/00*    (2006.01)
(52) U.S. Cl.
USPC .............................. 714/774; 714/748; 455/9
(58) Field of Classification Search
USPC ...................... 714/774, 748; 455/9
See application file for complete search history.

(56) References Cited

U.S. PATENT DOCUMENTS

| | | | |
|---|---|---|---|
| 7,389,462 B1* | 6/2008 | Wang et al. | 714/748 |
| 7,716,379 B2* | 5/2010 | Ruan et al. | 709/250 |
| 7,869,355 B2* | 1/2011 | Kodama et al. | 370/230 |
| 2003/0079033 A1 | 4/2003 | Craft et al. | |
| 2004/0257370 A1* | 12/2004 | Lippincott et al. | 345/502 |
| 2005/0066060 A1 | 3/2005 | Pinkerton et al. | |
| 2005/0163070 A1* | 7/2005 | Farnham et al. | 370/328 |
| 2009/0063696 A1* | 3/2009 | Wang et al. | 709/232 |
| 2009/0073884 A1* | 3/2009 | Kodama et al. | 370/235 |
| 2009/0122874 A1* | 5/2009 | Kolze et al. | 375/240.24 |

OTHER PUBLICATIONS

International Search Report and Written Opinion—PCT/US2010/021864—ISA/EPO—May 7, 2010.
Lee, et al., "Delay-bounded semi-reliable vital sign transmission protocol for mobile telemedicine over a CDMA 1x EV-DO network", Medical Engineering & Physics, Butterworth-Heinemann, GB LNKD DOI:10.1016/J.Medengphy, 2007.04.012, vol. 30, No. 3, Mar. 4, 2008, pp. 293-298, XP022511213 ISSN: 1350-4533 abstract p. 1, col. 2, lines 10-14 p. 2, col. 2, line 37—p. 3, col. 1, line 27.

* cited by examiner

*Primary Examiner* — M. Mujtaba K Chaudry
(74) *Attorney, Agent, or Firm* — Tyler J. Overall

(57) ABSTRACT

Certain embodiments of the present disclosure control whether or not certain protocol stack operation are performed in a hardware (HW) protocol stack accelerator based on ARQ/HARQ re-transmission rate. Latency penalties associated with using the HW accelerator are typically higher than the data movement overhead when this data does not need to be processed by the HW accelerator, such as when a re-transmission error occurs. According to certain embodiments, the HW accelerator is activated if the ARQ/HARQ re-transmission rate is below a threshold value. Otherwise, if the ARQ/HARQ re-transmission rate is above a threshold, at least a portion of the HW accelerator may be de-activated, which may reduce overhead associated with moving data between the protocol stack and the HW accelerator.

20 Claims, 11 Drawing Sheets

RETRANSMISSION RATE $(1-P) \leq T_1$ $1-P > T_1$

US 8,738,997 B2

METHODS AND SYSTEMS USING THRESHOLD SWITCHES FOR PROTOCOL ACCELERATORS

TECHNICAL FIELD

Certain embodiments of the present disclosure generally relate to wireless communication and, more particularly, to increasing the effectiveness of protocol accelerators by using threshold switches.

SUMMARY

Certain embodiments provide a method for wireless communications. The method generally includes monitoring a retransmission rate for packets received, offloading operations related to protocol stack computations to protocol stack hardware accelerator, and varying a relative percentage of operations offloaded to the protocol stack hardware accelerator as a function of the retransmission rate.

Certain embodiments provide an apparatus for wireless communications. The apparatus generally includes logic for monitoring a retransmission rate for packets received, logic for offloading operations related to protocol stack computations to protocol stack hardware accelerator, and logic for varying a relative percentage of operations offloaded to the protocol stack hardware accelerator as a function of the retransmission rate.

Certain embodiments provide an apparatus for wireless communications. The apparatus generally includes means for monitoring a retransmission rate for packets received, means for offloading operations related to protocol stack computations to protocol stack hardware accelerator, and means for varying a relative percentage of operations offloaded to the protocol stack hardware accelerator as a function of the retransmission rate.

Certain embodiments provide a computer-program product for wireless communications, comprising a computer readable medium having instructions stored thereon, the instructions being executable by one or more processors. The instructions generally include instructions for monitoring a retransmission rate for packets received, instructions for offloading operations related to protocol stack computations to protocol stack hardware accelerator, and instructions for varying a relative percentage of operations offloaded to the protocol stack hardware accelerator as a function of the retransmission rate.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
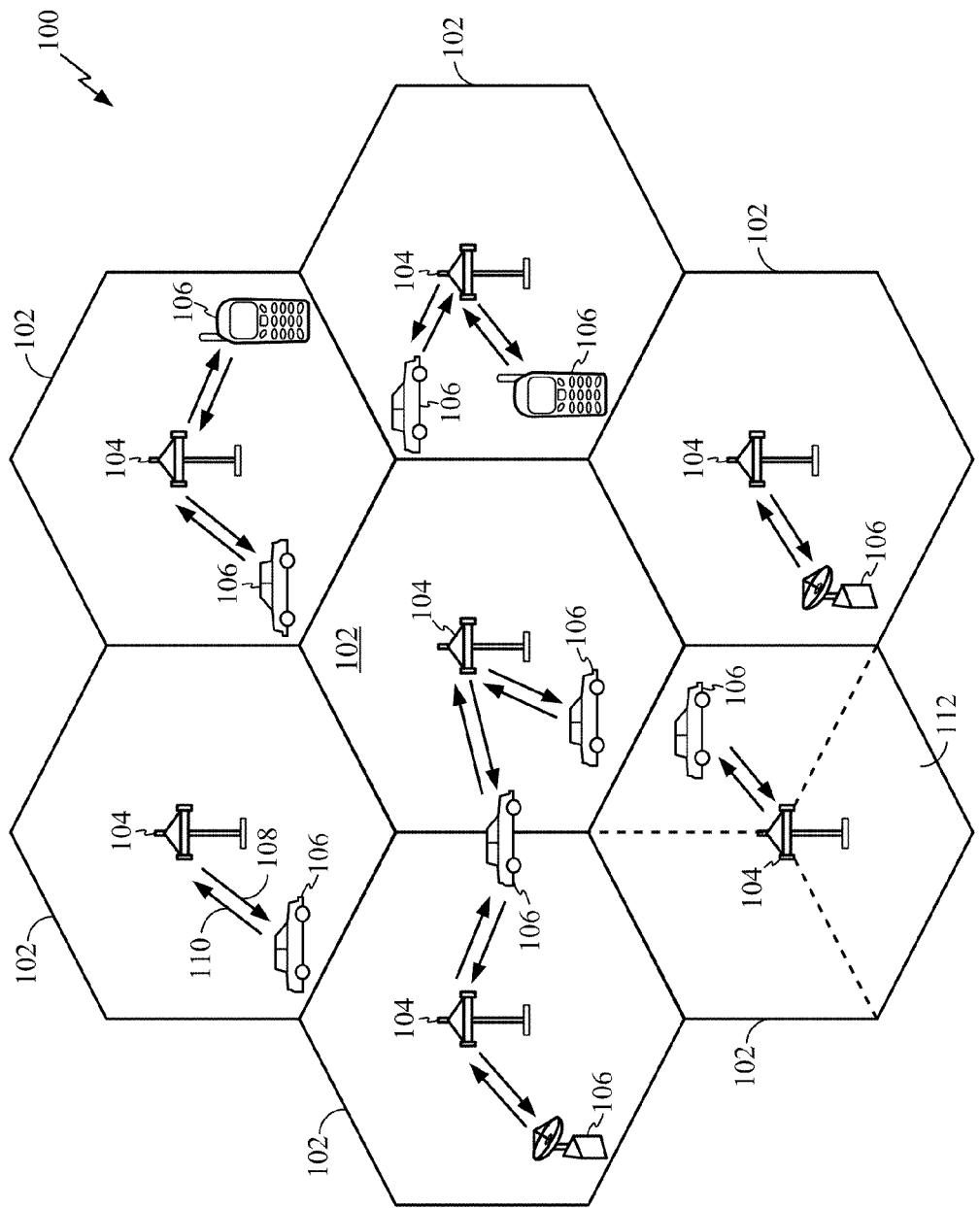
FIG. 1 illustrates an example wireless communication system, in accordance with certain embodiments of the present disclosure.

As wireless communication systems evolve, data rates continue to increase from the initial relatively low data rate required for conventional voice calls to high data rates of 300 Mbps for applications such as streaming video. In order to process data at these higher rates, mobile station (MS) processors must operate at higher rates and, often utilize protocol accelerators to speed processing by accelerating protocol stack computations.

Not all mobile devices use protocol accelerators and, often, the use of a protocol accelerator is a design choice. Protocol accelerators may not be justified with relatively simple protocols, where data rate is limited, and the processor is powerful. With more complex, high speed data rate protocols, however, the mobile device may only be able to meet performance requirements by offloading operations to a hardware protocol accelerator.

Some of the examples of the operations being offloaded into the hardware protocol accelerator include de-ciphering operations and error detection (e.g., cyclic redundancy check—CRC checking) as required in the media access control (MAC) layer of a mobile device.

Simply offloading all stack computations to a protocol accelerator, however, can be inefficient, particularly when transmission errors occur rendering the results of pre-processing operations invalid.

Certain embodiments of the present disclosure generally allow the relative percentage of operations offloaded to a protocol hardware accelerator to be varied based on a packet retransmission rate, such as an ARQ retransmission rate. As the retransmission rate increases, a set of switches may be controlled to route relatively fewer operations to the protocol accelerator in an effort to reduce latency penalties associated with invalid results. As the retransmission rate decreases, the set of switches may be controlled to route relatively more operations to the protocol accelerator in an effort to reduce latency penalties. As a result, the use of threshold switches presented herein may help reduce latency overhead associated with protocol accelerator use, while avoiding unnecessary power consumption.

The techniques presented herein may be used to control a protocol accelerator based on retransmission rate information in a variety of forms. For example, ARQ retransmission rate may be used or, for systems utilizing Hybrid ARQ (HARQ) schemes, a protocol accelerator may be controlled based on HARQ failure rate. Thus, while typical network deployments allow either ARQ or HARQ, but not both ARQ and HARQ at the same time, the techniques presented herein may be utilized regardless of which is implemented to take care of retransmissions.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
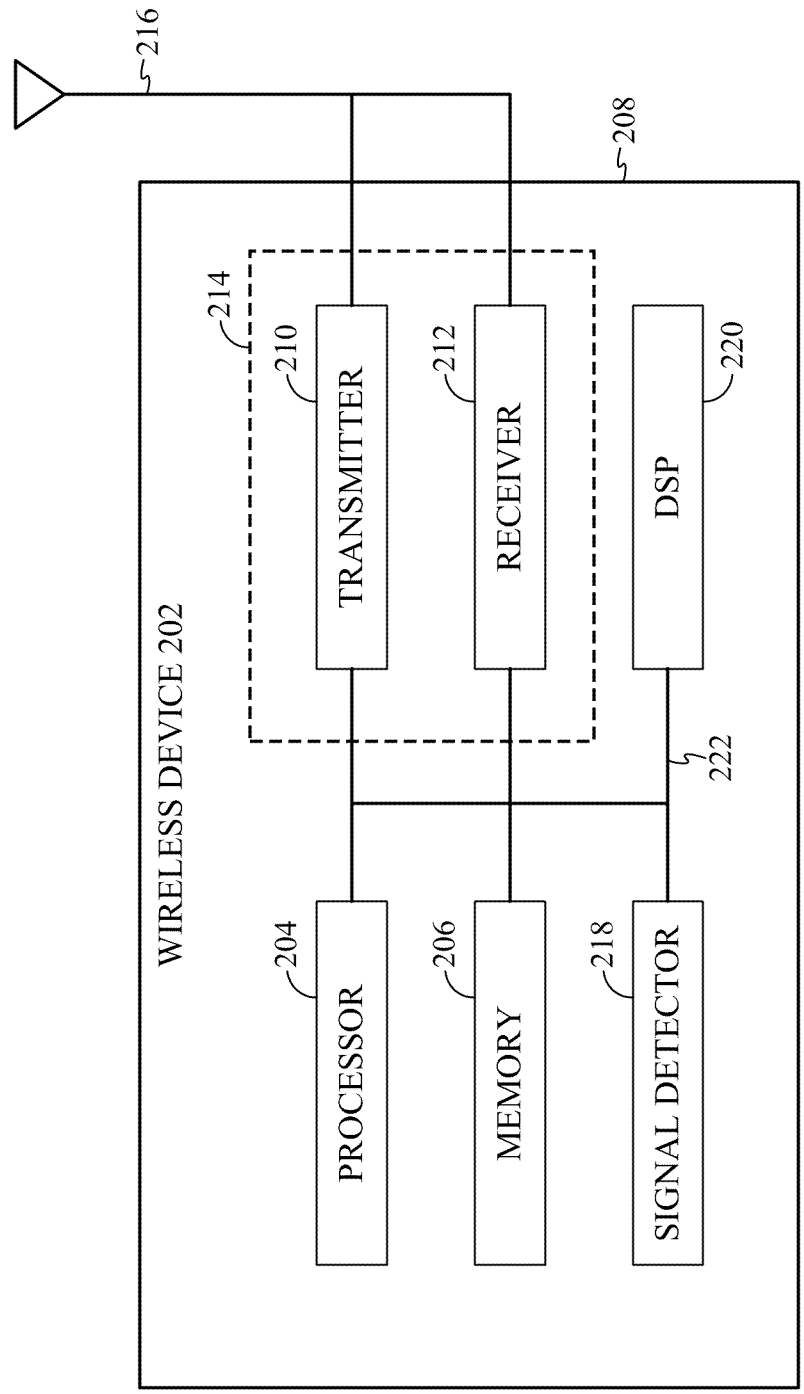
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
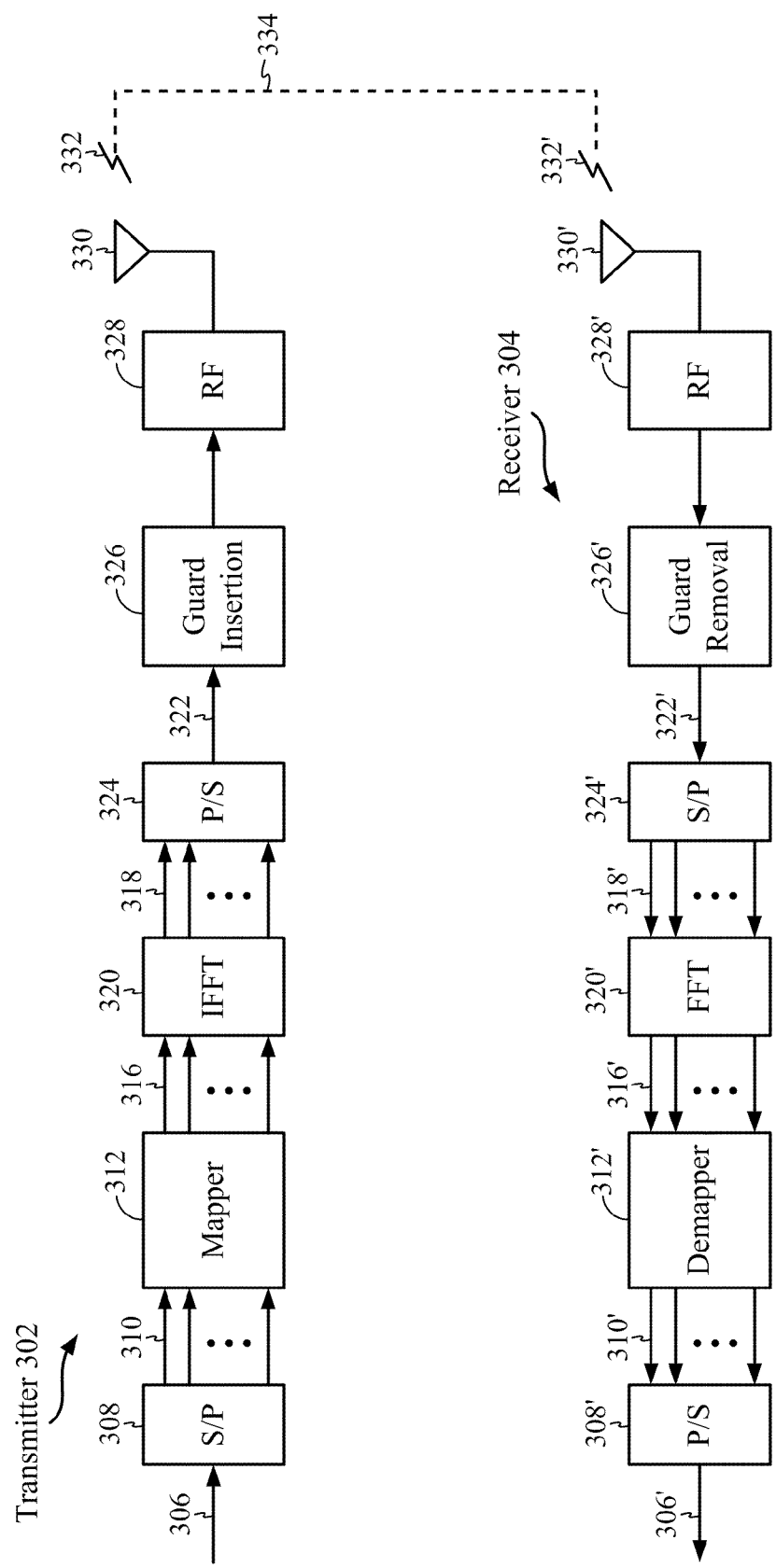
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Threshold Switches for Protocol Accelerators Used with Mobile Devices

By controlling the relative number of operations offloaded to a hardware protocol accelerator (or protocol stack hardware-PS HW) as a function of retransmission rate (e.g., as indicated by ARQ retransmission rate and/or HARQ failure rate), embodiments of the present disclosure may allow for more efficient processing. As will be described in greater detail below, a set of threshold switches may be controlled based on the retransmission rate to effectively increase or decrease the amount of operations offloaded to the PS HW, relative to a main processor. In general, when the retransmission rate exceeds a certain threshold level, the latency penalties associated with offloading operations to the PS HW may offset the processing gain achieved by the PS HW.

Figure 4:
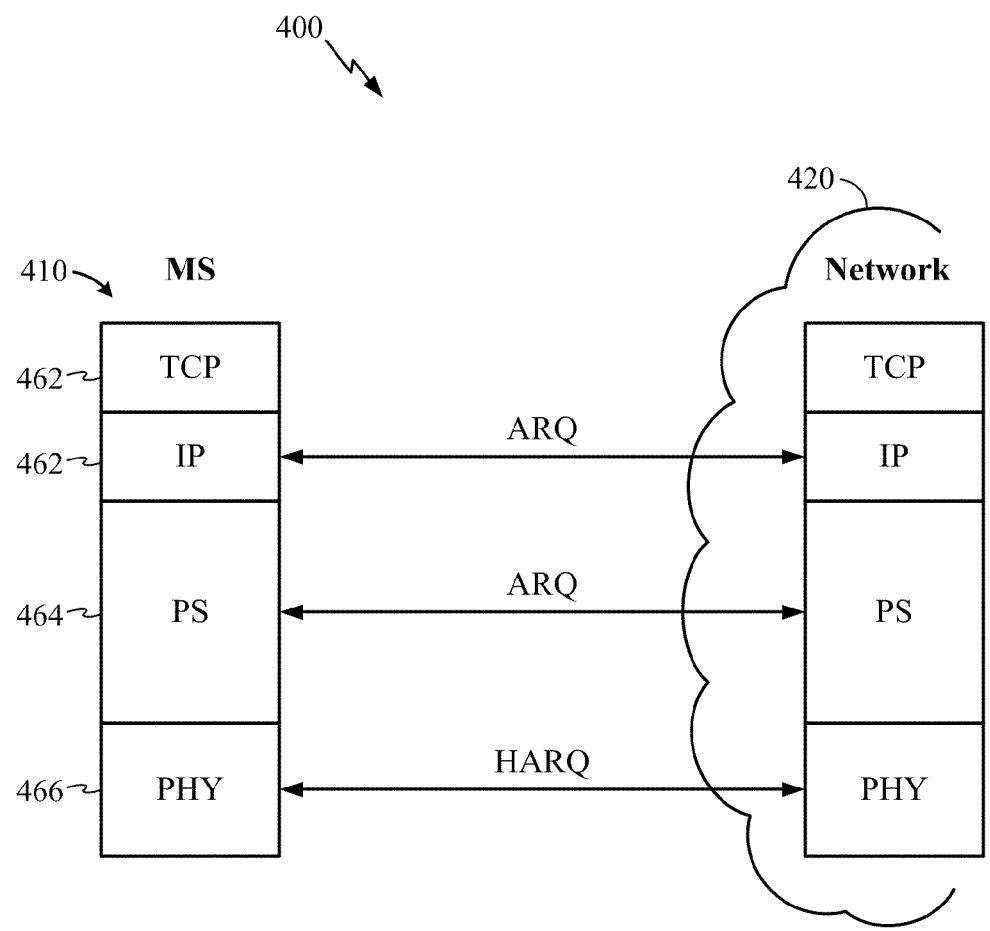
FIG. 4 illustrates an example diagram of a mobile device using automatic repeat request (ARQ) protocols to secure a correct wireless data transmission, in accordance with certain embodiments of the present disclosure.

FIG. 4 illustrates an example diagram of a mobile device 400 utilizing an automatic repeat request (ARQ) protocol, in accordance with certain embodiments of the present disclosure. Different layers may implement the ARQ protocol. For example, the TCP/IP layer 462 and protocol stack (PS) 464 may each implement the ARQ protocol, while the physical layer (PHY) 466 and hybrid ARQ (HARQ) protocol for the physical layer (PHY) 466. Implementing some for of ARQ at these different levels allows for robust communications, even if a set of packets are passed up from the PHY layer, if the higher level determines an invalid transaction (e.g., due to a time out or an invalid sequence) a retransmission will be prompted.

Figure 5:
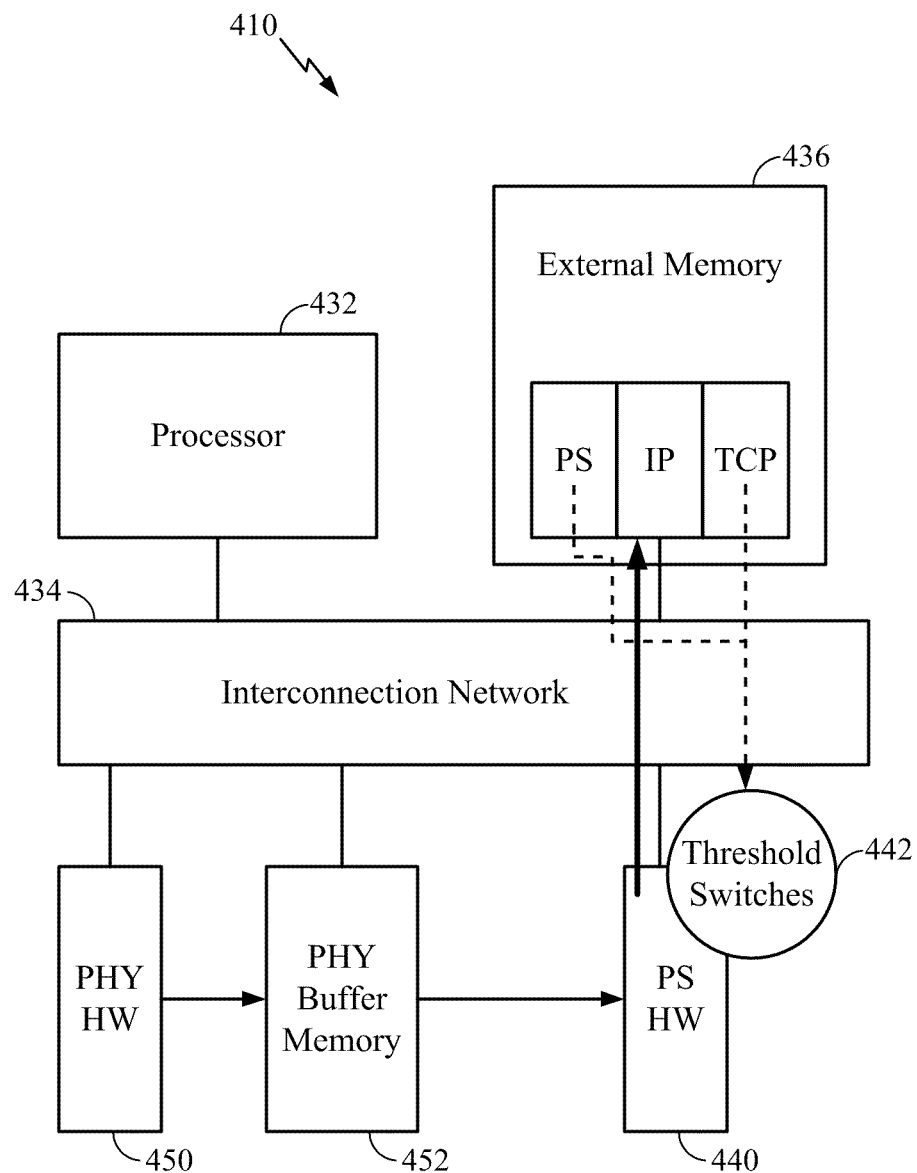
FIG. 5 illustrates an example mobile device utilizing a hardware protocol accelerator with threshold switches, in accordance with certain embodiments of the present disclosure.

FIG. 5 illustrates a block diagram of an example mobile device 410 capable of offloading operations from a processor 432 to protocol stack hardware (PS HW) 440. In general, a packet may be decoded by physical layer hardware (PHY HW) 450 and, assuming successful decoding, the packet may be passed to a PHY buffer 452. An interconnection network 434 may route packets from the PHY buffer 452 to external memory 436, where corresponding operations may be performed by the PS HW 440 or the processor 432, via external memory 436. As will be described in greater detail below, a set of threshold switches 442 may control the relative amount of operations offloaded to the PS HW 440.

Figure 6:
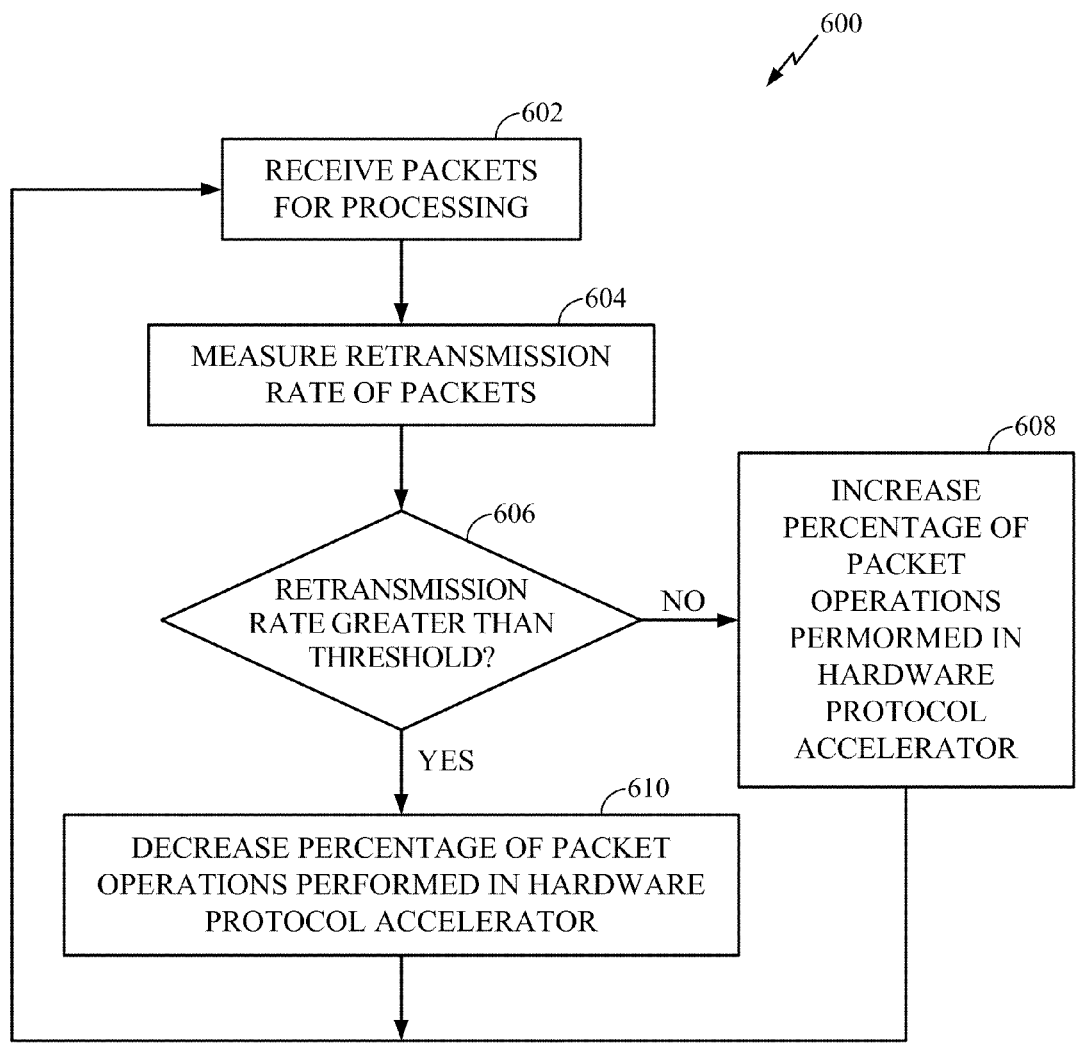
FIG. 6 illustrates example operations for controlling the routing of packet operations to be performed in a protocol accelerator based on ARQ retransmission rate, in accordance with certain embodiments of the present disclosure.
Figure 6A:
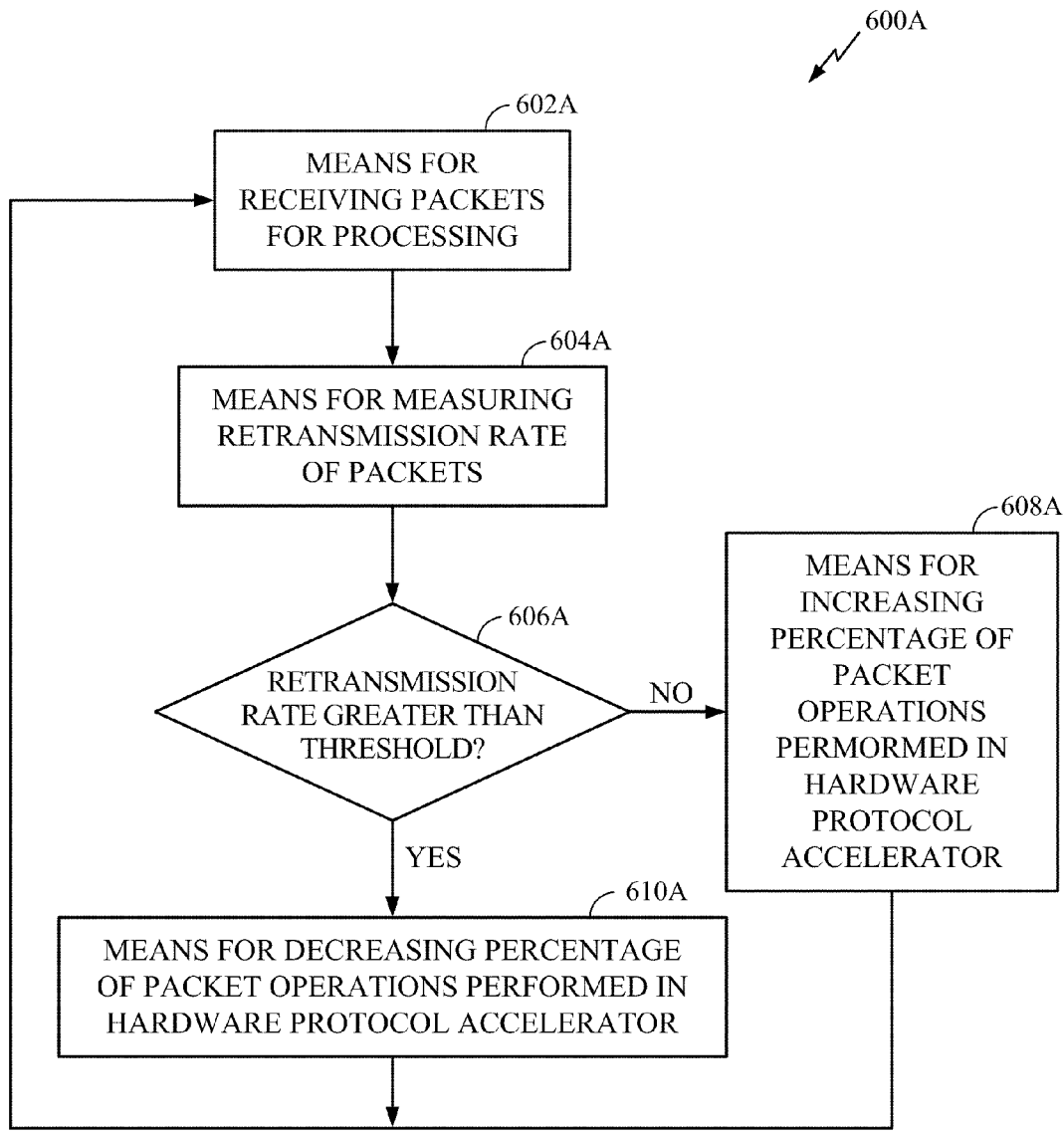
FIG. 6A illustrates example components capable of performing the operations shown in FIG. 6.

FIG. 6 illustrates example operations 600 that may be performed to control the amount (e.g., vary the relative percentage) of operations offloaded to the PS HW based on ARQ retransmission rate, in accordance with embodiments of the present disclosure. The operations 600 may be performed, for example, by an MS or BS that utilizes ARQ and or HARQ at one or more levels. The operations will be described below with general reference to retransmission rate which, as noted above, may be measured, for example, by ARQ retransmission rate or HARQ failure rate.

The operations 600 begin, at 602, by receiving packets for processing. While receiving packets, retransmission rate is measured, at 604. If the retransmission rate exceeds a threshold, as determined at 606, the percentage of packet operations performed in the PS HW is decreased, at 610. On the other hand, if the retransmission rate exceeds a threshold, as determined at 606, the percentage of packet operations performed in the PS HW is decreased, at 610.

For certain embodiments, multiple thresholds may be used. For example, to provide some type of hysteresis, a first threshold may be used which, when exceeded, results in a decrease in percentage of packet operations performed by the PS HW. A second (lower) threshold may be used which, when the retransmission rate falls below the second threshold, the percentage of packet operations performed by the PS HW is increased. In addition, multiple thresholds may be used to select from a predetermined set of percentages of operations routed to the PS HW. For example, a first percentage of operations may be offloaded to the PS HW if the retransmission rate is below a first threshold and a second (larger) percentage of operations may be offloaded to the PS HW if the retransmission rate is below a second (lower) threshold. Any suitable number of different percentages may be used to achieve a desired result.

Figure 7:
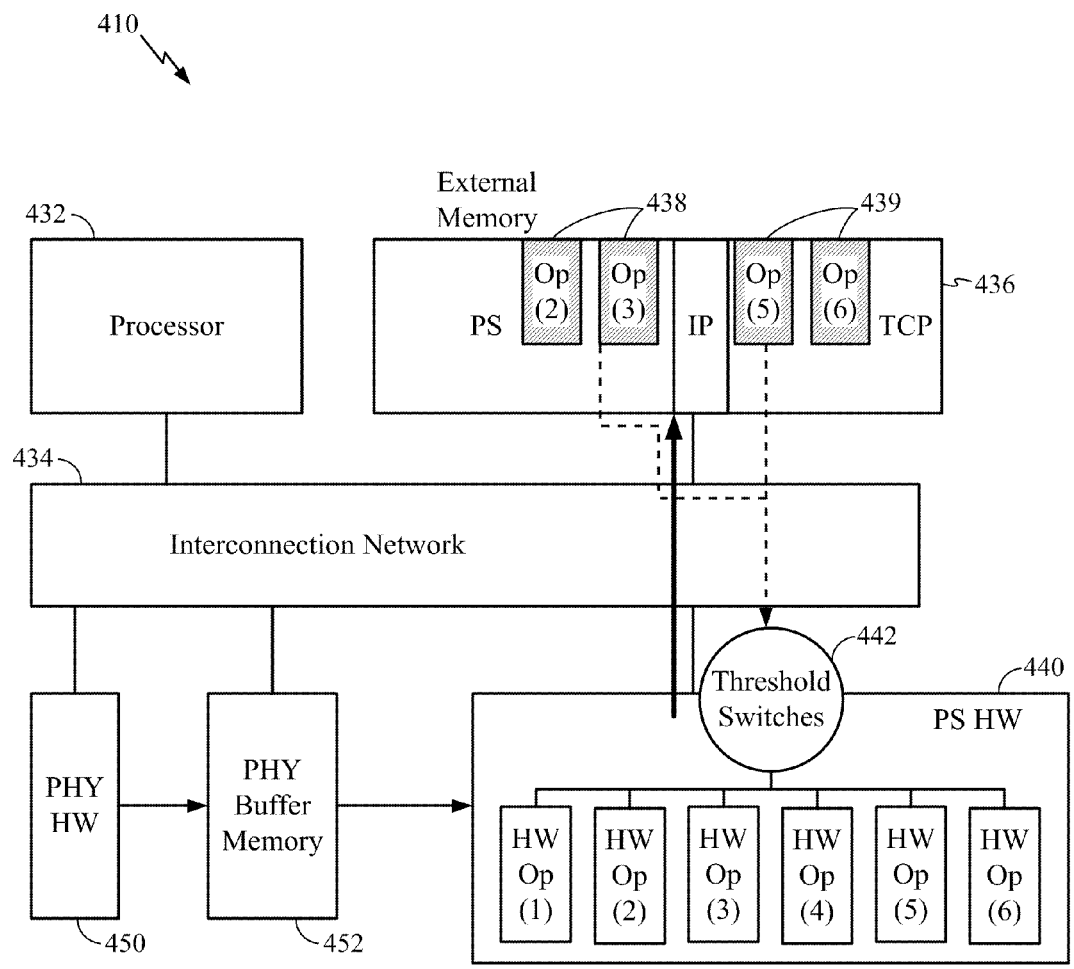
FIG. 7 illustrates offloading packet operations to a protocol accelerator, in accordance with certain embodiments of the present disclosure.

FIG. 7 illustrates how a set of threshold switches 442 may be used to control the ratio of operations 438 routed to the PS HW 440. In the illustrated example, up to six operations, OP(1)-OP(6), may be offloaded to PS HW 440. However, in the illustrated scenario, the threshold switches 442 are controlled to offload only four operations: OP(2) and OP(3) from the PS, OP(5) and OP(6) from the IP layer. As will be described in greater detail below, the threshold switches 442 may be controlled to vary the ratio of operations offloaded to the PS HW 440 as a function of retransmission rate, in an effort to gain a balance between processing gain and latency penalties.

For certain embodiments, an ideal hardware acceleration "gain" C in terms of numbers of clock cycles gained by offloading instructions to the PS HW may be calculated. For example, assuming it takes x cycles to perform an operation in the PS HW and y cycles to perform the operation in the processor (SW), the ideal gain C (achievable with no transmission errors) may be defined as:

$$y = Cx, \text{ where } C > 1 \quad (1)$$

Factoring in retransmission rate, however, an actual achievable gain G may be substantially less than C. ARQ retransmission rate, RARQ, is a relative value (relative to successful transmissions), which may be defined as:

$$RARQ = 1 - P, \text{ where } 0 = <P = <1 \quad (2)$$

The actual cycle gained by HW, G, may then be calculated as follows:

$$G = (P)(y-x) - (1-P)x = (P)(Cx-x) - (1-P)x = (PC-1)x \quad (3)$$

Thus, P(y−x) represents the gain in cycles when ARQ retransmission is not required and (1−P)x represents the loss in cycles when ARQ retransmission is required. As noted above, HARQ retransmission (or failure) rate may also be used in a similar manner.

In any case, G/x=(PC−1), which indicates that the actual hardware acceleration achieved is affected by P and C. The acceleration ratio drops when there is a transmission error, such that the higher the transmission error rate, the lower the acceleration ratio. This is illustrated in FIG. 9, which charts the acceleration ratio (vertical axis) versus ARQ retransmission rate, 1−P (horizontal axis) for acceleration ratios C ranging from 1 to 4.

Figure 9:
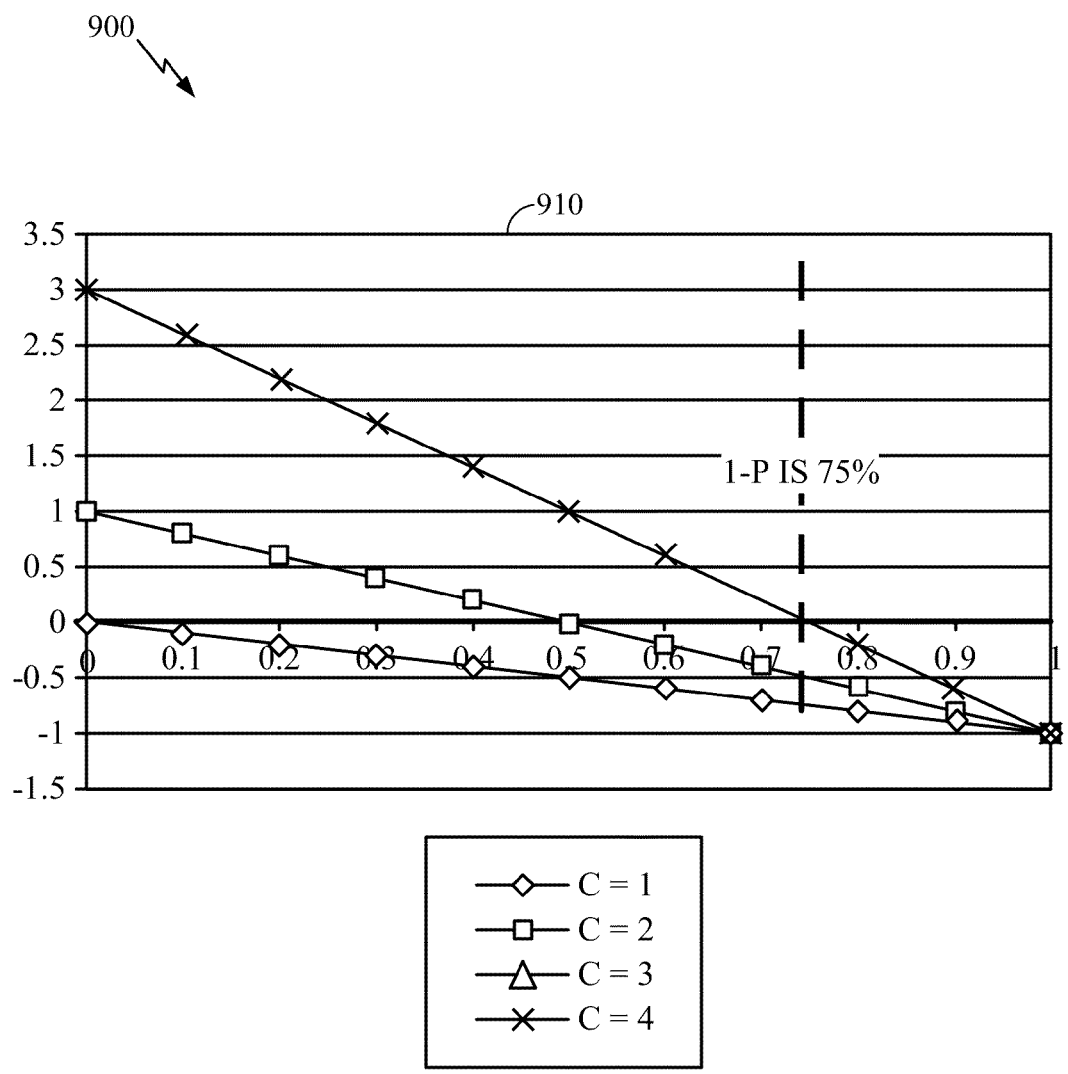
FIG. 9 illustrates the effect of ARQ retransmission rate on protocols accelerators, in accordance with certain embodiments of the present disclosure.

As illustrated in FIG. 9, as the retransmission rate reaches approximately 75%, there may be no acceleration even with an ideal hardware acceleration ratio C of 4. As long as there are some successful transmissions (1−P is less than 1), the mobile station will still be able to receive some data or PDUs. However, fewer PDUs will be transferred to the upper layer of the protocol stack (PS) and IP stack. Thus, power savings may be achieved by using the processor to execute operations, rather than offload these operations to the PS HW.

FIGS. 8A-8D illustrate how threshold switches may be controlled, based on retransmission rate, to vary the amount of operations offloaded to the PS-HW. In the simplified example, a first threshold switch 4421 controls whether or not operations 2 and 3 are routed to the PS-HW, while a second threshold switch 4422 controls whether or not operations 5 and 6 are routed to the PS-HW.

When the retransmission rate is at or below a certain threshold (T1), it may be beneficial to have an increased percentage of packet operations performed in the protocol accelerator. This may be achieved by turning on/off one or more threshold switches.

Figure 8A:
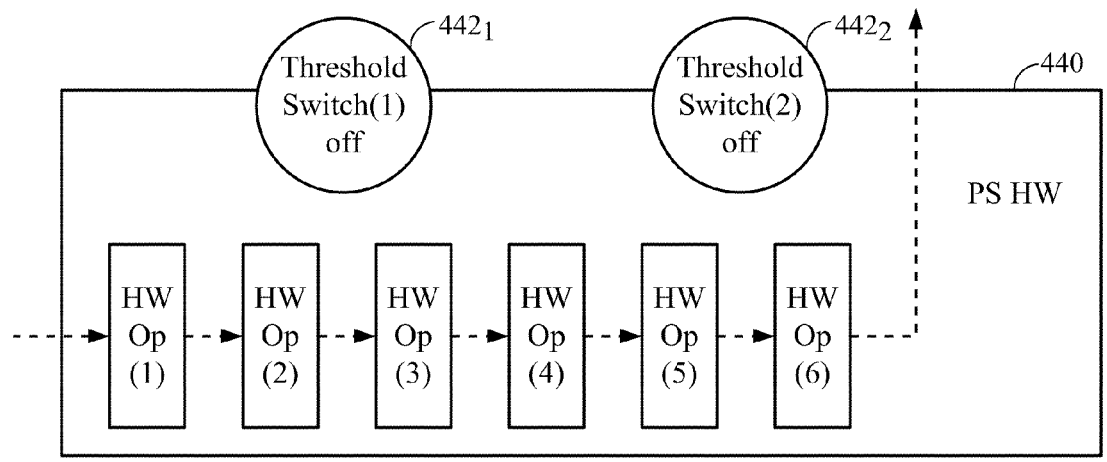
FIGS. 8A-D illustrate the control of threshold switches based on ARQ retransmission rate, in accordance with certain embodiments of the present disclosure.
Figure 8B:
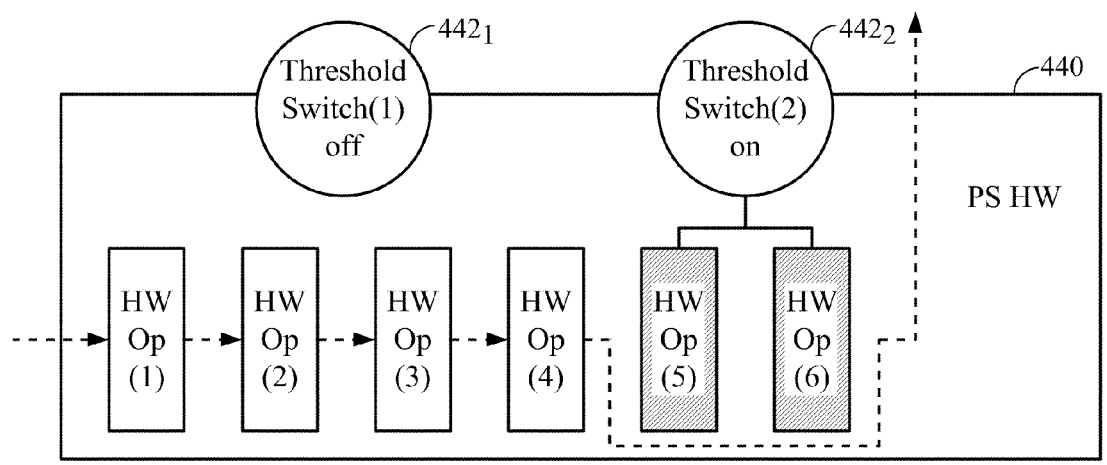

For example, as illustrated in FIG. 8A, when the retransmission rate is at or below T1 (1−P<T1), both threshold switches 4421 and 4422 may be turned off, allowing for an increased percentage of packet operations to be performed in the PS-HW. On the other hand, as illustrated in FIG. 8B, when the retransmission rate is greater than T1 (1−P>T1), threshold switch 4422 may turn on, decreasing the percentage of packet operations performed in the protocol accelerator. The decreased performance avoids unnecessary computation in the protocol accelerator, which may reduce power consumption for the MS.

Figure 8C:
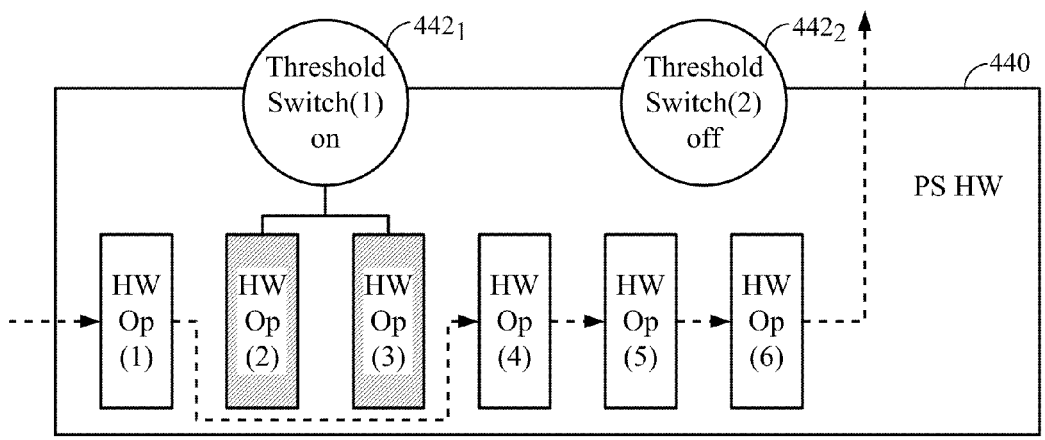

Intermediate thresholds may also be used and different thresholds may be used to control different switches. For example, as illustrated in FIG. 8C, when the retransmission rate may be greater than another threshold value (T1Δ), threshold switch 4421 may be and threshold switch 4422 may remain turned off. While in the illustrated example, each threshold switch controls the routing of two operations, for different embodiments, different threshold switches may control the routing of different numbers of operations, allowing greater flexibility in controlling the ratio of operations offloaded to the PS HW.

Figure 8D:
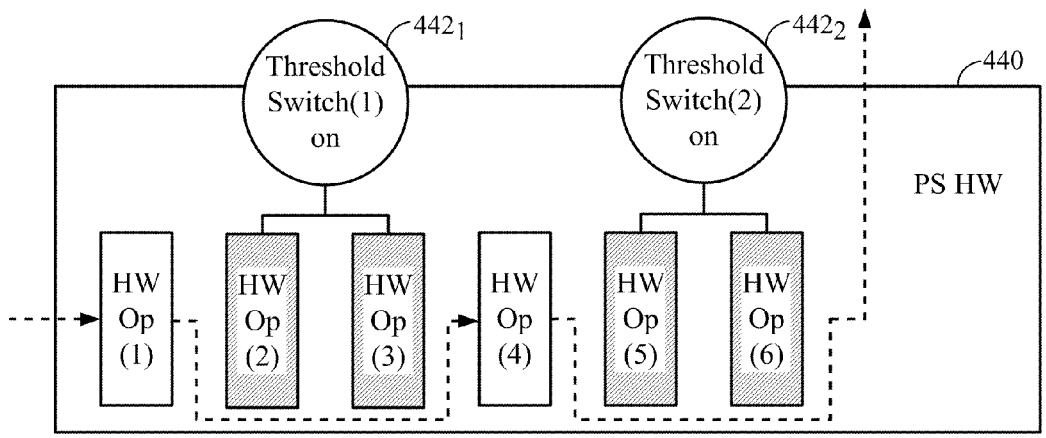

FIG. 8D illustrates an example when the retransmission rate may be greater than a threshold (T2), requiring multiple threshold switches to turn on (4421 and 4422), further decreasing the percentage of packet operations performed in the protocol accelerator. By limiting the number of operations offloaded to PS HW, the decreased operations performed in the PS HW may help reduce power consumption, by avoiding the latency associated with "pre-processing" operations that are ultimately found to correspond to invalid data in the protocol stack (PS) layer.

As illustrated in FIG. 9, as the retransmission rate increases, the effective acceleration ratio of the protocol accelerator may decrease, which may reduce the benefit of offloading operations from the processor to the protocol accelerator. As described above, to account for this, as the retransmission rate increases, threshold switches may be turned on, reducing the percentage of packet operations performed in the protocol accelerator.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, 502-512 illustrated in FIG. 5 correspond to means-plus-function blocks 502A-512A illustrated in FIG. 11A. Similarly, blocks 1102-1112 illustrated in FIG. 11 correspond to means-plus-function blocks 1102A-1112A illustrated in FIG. 11A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims. It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
monitoring a retransmission rate for packets received;
offloading operations related to protocol stack computations to a protocol stack hardware accelerator; and
varying a relative percentage of operations offloaded to the protocol stack hardware accelerator as a function of the retransmission rate, wherein varying a relative percentage of operations offloaded to the protocol stack hardware accelerator comprises controlling a set of one or more switches that each control whether a set of one or more operations are offloaded to the protocol stack hardware accelerator, wherein controlling the set of one or more switches comprises:
determining whether the retransmission rate exceeds a first threshold value;
if the retransmission rate exceeds the first threshold value, controlling one or more of the switches to offload a first relative percentage of operations to the protocol stack hardware accelerator;
determining whether the retransmission rate exceeds a second threshold value; and
if the retransmission rate exceeds the second threshold value, controlling one or more of the switches to offload a second relative percentage of operations to the protocol stack hardware accelerator.

2. The method of claim 1, wherein:
monitoring a retransmission rate for packets received comprises monitoring an automatic repeat request (ARQ) retransmission rate for one or more protocol layers.

3. The method of claim 1, wherein:
monitoring a retransmission rate for packets received comprises monitoring a hybrid automatic repeat request (HARQ) failure rate for one or more protocol layers.

4. The method of claim 1, wherein varying a relative percentage of operations offloaded to the protocol stack hardware accelerator as a function of the retransmission rate comprises:
increasing the relative percentage of operations offloaded to the protocol stack hardware accelerator as retransmission rate decreases; and
decreasing the relative percentage of operations offloaded to the protocol stack hardware accelerator as retransmission rate increases.

5. The method of claim 1, wherein controlling a set of one or more switches that each control whether a set of one or more operations are offloaded to the protocol stack hardware comprises:
determining whether the retransmission rate exceeds a threshold value; and
if the retransmission rate exceeds the threshold value, controlling one or more of the switches to reduce the relative percentage of operations offloaded to the protocol stack hardware accelerator.

6. An apparatus for wireless communications, comprising:
logic for monitoring a retransmission rate for packets received;
logic for offloading operations related to protocol stack computations to a protocol stack hardware accelerator; and
logic for varying a relative percentage of operations offloaded to the protocol stack hardware accelerator as a function of the retransmission rate, the logic for varying a relative percentage of operations offloaded to the protocol stack hardware accelerator comprising logic for controlling a set of one or more switches that each control whether a set of one or more operations are offloaded to the protocol stack hardware accelerator, wherein the logic for controlling the set of one or more switches comprises:
logic for determining whether the retransmission rate exceeds a first threshold value and, if the retransmission rate exceeds the first threshold value, controlling one or more of the switches to offload a first relative percentage of operations to the protocol stack hardware accelerator; and
logic for determining whether the retransmission rate exceeds a second threshold value and, if the retransmission rate exceeds the second threshold value, controlling one or more of the switches to offload a second relative percentage of operations to the protocol stack hardware accelerator.

7. The apparatus of claim 6, wherein the logic for monitoring a retransmission rate for packets received comprises logic for monitoring an automatic repeat request (ARQ) retransmission rate for one or more protocol layers.

8. The apparatus of claim 6, wherein the logic for monitoring a retransmission rate for packets received comprises logic for monitoring a hybrid automatic repeat request (HARQ) failure rate for one or more protocol layers.

9. The apparatus of claim 6, wherein the logic for varying a relative percentage of operations offloaded to the protocol stack hardware accelerator as a function of the retransmission rate comprises:
logic for increasing the relative percentage of operations offloaded to the protocol stack hardware accelerator as retransmission rate decreases and decreasing the relative percentage of operations offloaded to the protocol stack hardware accelerator as retransmission rate increases.

10. The apparatus of claim 6, wherein the logic for controlling a set of one or more switches that each control whether a set of one or more operations are offloaded to the protocol stack hardware comprises:
logic for determining whether the retransmission rate exceeds a threshold value and, if the retransmission rate exceeds the threshold value, controlling one or more of the switches to reduce the relative percentage of operations offloaded to the protocol stack hardware accelerator.

11. An apparatus for wireless communications, comprising:
means for monitoring a retransmission rate for packets received;
means for offloading operations related to protocol stack computations to a protocol stack hardware accelerator; and
means for varying a relative percentage of operations offloaded to the protocol stack hardware accelerator as a function of the retransmission rate, wherein the means for varying a relative percentage of operations offloaded to the protocol stack hardware accelerator comprises means for controlling a set of one or more switches that each control whether a set of one or more operations are offloaded to the protocol stack hardware accelerator, wherein the means for controlling the set of one or more switches comprises:
means for determining whether the retransmission rate exceeds a first threshold value and, if the retransmission rate exceeds the first threshold value, controlling one or more of the switches to offload a first relative percentage of operations to the protocol stack hardware accelerator; and
means for determining whether the retransmission rate exceeds a second threshold value and, if the retransmission rate exceeds the second threshold value, controlling one or more of the switches to offload a second relative percentage of operations to the protocol stack hardware accelerator.

12. The apparatus of claim 11, wherein the means for monitoring a retransmission rate for packets received comprises means for monitoring an automatic repeat request (ARQ) retransmission rate for one or more protocol layers.

13. The apparatus of claim 11, wherein the means for monitoring a retransmission rate for packets received comprises means for monitoring a hybrid automatic repeat request (HARQ) failure rate for one or more protocol layers.

14. The apparatus of claim 11, wherein the means for varying a relative percentage of operations offloaded to the protocol stack hardware accelerator as a function of the retransmission rate comprises:
means for increasing the relative percentage of operations offloaded to the protocol stack hardware accelerator as retransmission rate decreases and decreasing the relative percentage of operations offloaded to the protocol stack hardware accelerator as retransmission rate increases.

15. The apparatus of claim 11, wherein the means for controlling a set of one or more switches that each control whether a set of one or more operations are offloaded to the protocol stack hardware comprises:
means for determining whether the retransmission rate exceeds a threshold value and, if the retransmission rate exceeds the threshold value, controlling one or more of the switches to reduce the relative percentage of operations offloaded to the protocol stack hardware accelerator.

16. A computer-program product for wireless communications, comprising a non-transitory computer readable medium having instructions stored thereon, the instructions being executable by one or more processors and the instructions comprising:

instructions for monitoring a retransmission rate for packets received;

instructions for offloading operations related to protocol stack computations to a protocol stack hardware accelerator; and instructions for varying a relative percentage of operations offloaded to the protocol stack hardware accelerator as a function of the retransmission rate, wherein the instructions for varying a relative percentage of operations offloaded to the protocol stack hardware accelerator comprise instructions for controlling a set of one or more switches that each control whether a set of one or more operations are offloaded to the protocol stack hardware accelerator, wherein the instructions for controlling a set of one or more switches comprise:

instructions for determining whether the retransmission rate exceeds a first threshold value and, if the retransmission rate exceeds the first threshold value, controlling one or more of the switches to offload a first relative percentage of operations to the protocol stack hardware accelerator; and instructions for determining whether the retransmission rate exceeds a second threshold value and, if the retransmission rate exceeds the second threshold value, instructions for controlling one or more of the switches to offload a second relative percentage of operations to the protocol stack hardware accelerator.

17. The computer-program product of claim 16, wherein:
the instructions for monitoring a retransmission rate for packets received comprise instructions for monitoring an automatic repeat request (ARQ) retransmission rate for one or more protocol layers.

18. The computer-program product of claim 16, wherein:
the instructions for monitoring a retransmission rate for packets received comprise instructions for monitoring a hybrid automatic repeat request (HARQ) failure rate for one or more protocol layers.

19. The computer-program of claim 16, wherein the instructions for varying a relative percentage of operations offloaded to the protocol stack hardware accelerator as a function of the retransmission rate comprise:

instructions for increasing the relative percentage of operations offloaded to the protocol stack hardware accelerator as retransmission rate decreases; and instructions for decreasing the relative percentage of operations offloaded to the protocol stack hardware accelerator as retransmission rate increases.

20. The computer-program product of claim 16, wherein the instructions for controlling a set of one or more switches that each control whether a set of one or more operations are offloaded to the protocol stack hardware comprise:

instructions for determining whether the retransmission rate exceeds a threshold value and, if the retransmission rate exceeds the threshold value, controlling one or more of the switches to reduce the relative percentage of operations offloaded to the protocol stack hardware accelerator.

* * * * *